United States Patent [19]
Lustig et al.

[11] Patent Number: 6,034,203
[45] Date of Patent: Mar. 7, 2000

[54] CATALYSIS WITH TITANIUM OXIDES

[75] Inventors: Steven Raymond Lustig, Landenberg; Robert Ray Burch, Exton, both of Pa.; Eugene M. McCarron, III, Greenville, Del.

[73] Assignee: E. I. du Pont de Nemours and Company, Wilmington, Del.

[21] Appl. No.: 09/288,371

[22] Filed: Apr. 8, 1999

[51] Int. Cl.$^7$ .................................................. C08G 63/78
[52] U.S. Cl. ........................ 528/279; 528/271; 528/272; 528/275; 528/298; 528/302; 528/306; 528/307; 528/308; 528/308.6; 524/777; 524/783
[58] Field of Search ................................ 528/271, 272, 528/275, 279, 298, 302, 306, 307, 308, 308.6; 524/777, 783

[56] References Cited

U.S. PATENT DOCUMENTS 4,912,286  3/1990  Clarke ................................ 174/110 A
5,674,801  10/1997  George .................................. 502/327

FOREIGN PATENT DOCUMENTS

2518313/23-05  9/1980  U.S.S.R. .

*Primary Examiner*—Samuel A. Acquah

[57] ABSTRACT

A process which can be used in oligomerization, polymerization, or depolymerization such as, for example, the production of a polyester is provided. The process comprises contacting a carbonyl compound, in the presence of a composition, with an alcohol. The catalyst comprises a catalyst having the formula of $M_x Ti^{(III)}_y Ti^{(IV)}_z O_{(x+3+4y)/2}$ wherein M is an alkali metal, $Ti^{(III)}$ is titanium in the +3 oxidation state, $Ti^{(IV)}$ is titanium in the +4 oxidation state, x and y are numbers greater than or equal to zero wherein if x equals zero, y is a number less than ½.

19 Claims, No Drawings

CATALYSIS WITH TITANIUM OXIDES

FIELD OF THE INVENTION

This invention relates to a process using a titanium oxide as catalysts in an oligomerization process, polymerization process, depolymerization process, or combinations of two or more thereof.

BACKGROUND OF THE INVENTION

Oxides of titanium are known in the art. Among many others, Nawata et al (JP51081896) discloses use of $TiO_2$ as a catalyst for production of high molecular weight polyesters. Shtokoreva et al (SU765290) cites the use of $Ti_nO_{2n-1}$ were n=3–7. The formula $Ti_nO_{2n-1}$ for these compositions can be equivalently rewritten as $TiO_x[x=(2n-1)/n]$ wherein x is between 5/3 (n=3) and 13/7 (n=7). Oxides of titanium have a variety of industrial applications.

The production of polyesters by polycondensation of diols and hydrocarbyl diacids is well known in the art, as described in the *Encyclopeda of Polymer Science and Engineering,* 2nd ed, volume 12, John Wiley and Sons, New York (1988). The most common polyester so produced is poly(ethylene terephthalate) (hereinafter referred to as PET). PET is generally formed into a low molecular weight prepolymer by transesterification of dimethyl terephthalate or esterification of terephthalic acid with ethylene glycol to form a bis(hydroxyalkyl)ester which is subsequently subject to polycondensation by transesterification to form a high molecular weight polyester. Because the transesterification is an inherently slow reaction, which requires holding the reactants at elevated temperatures for protracted periods with concomitant thermal degradation, the polycondensation step is generally catalyzed.

It is, however, highly desirable to produce a polyester with usefully high molecular weight and low yellowness at as high a rate as possible. Yellowness in polyesters is normally a result of polymer degradation and side reactions occurring during either polymerization or down-stream processing. Thus yellowness in the polymer as synthesized is indicative not only of the quality of the polymer so-produced, but also of further processibility of the polymer into fabricated forms in color-sensitive applications such as fibers, films, and certain molded parts. While many catalysts for production of high molecular weight polyesters are known, they suffer from a deficiency in either rate of conversion, ease of use, or quality of the product formed therewith.

Antimony-containing compounds are currently in widespread commercial use as catalysts which provide a desirable combination of high reaction rate and low color. However, there is considerable inducement to find a substitute for antimony because of the expense and difficulty of handling the known-to-be toxic antimony in an environmentally responsible manner.

SUMMARY OF THE INVENTION

The present invention provides a process which can be used in oligomerization, polymerization, depolymerization, or combinations of two or more thereof such as, for example, the production of a polyester. The process comprises contacting a carbonyl compound with an alcohol compound in the presence of a catalyst mixture comprising a compound having the formula of $M_x Ti^{(III)}{}_y Ti^{(IV)}{}_y O_{(x+3+4y)/2}$ wherein M is an alkali metal, $Ti^{(III)}$ is titanium in the +3 oxidation state, $Ti^{(IV)}$ is titanium in the +4 oxidation state, x and y are numbers greater than or equal to zero, and if x equals to zero, y is a number less than ½. The process can further comprise recovering the product produced by the process.

DETAILED DESCRIPTION OF THE INVENTION

According to the invention, the process can comprise, consist essentially of, or consist of contacting a carbonyl compound, in the presence of a catalyst composition and under a condition sufficient to effect the production of a polyester. The composition comprises, consists essentially of, or consists of a titanium catalyst having the formula of $M_x Ti^{(III)} Ti^{(IV)}{}_y O_{(x+3+4y)/2}$ wherein M is an alkali metal, $Ti^{(III)}$ is titanium in the +3 oxidation state, $Ti^{(IV)}$ is titanium in the +4 oxidation state, x and y are numbers greater than or equal to zero, and if x equals to zero, y is a number less than ½. The aforementioned formula can be equivalently expressed $M_x Ti_{y+1} O_{(x+3+4y)/2}$ or equivalently expressed as $M_{x/(1+y)} TiO_{(x+3+4y)/(2y+2)}$. The presently preferred titanium oxide can be expressed as $TiO_z$ in which z is a number between 1 and 1.67, preferably between 1.4 and 1.6, and most preferably 1.5. The presently most preferred titanium oxide is $TiO_{1.5}$ or $Ti_2O_3$.

According to the invention, any carbonyl compound which can react with an alcohol to produce an ester can be used. Generally, such carbonyl compounds include, but are not limited to, acids, esters, amides, acid anhydrides, acid halides, oligomers or polymers having repeat units derived from an acid, or combinations of two or more thereof The presently preferred acid is an organic acid. The presently preferred process is the polymerization of an acid and an alcohol for the production of a polyester.

A preferred process for producing a polyester comprises, consists essentially of, or consists of contacting a polymerization mixture with a composition which comprises a titanium catalyst having the formula disclosed above. The polymerization mixture can comprise, consist essentially of, or consist of (1) either an organic acid or an ester thereof and an alcohol or (2) an alcohol and an oligomer having repeat units derived from an organic acid or ester.

The organic acid or ester thereof can have the formula of $R^1 COOR^2$ in which $R^1$ and $R^2$ can be the same or different and can be (1) hydrogen, (2) hydrocarboxyl radical having a carboxylic acid group at the terminus, or (3) hydrocarbyl radical in which each radical has 1 to about 30, preferably about 3 to about 15 carbon atoms per radical which can be alkyl, alkenyl, aryl, alkaryl, aralkyl radical, or combinations of two or more thereof The presently preferred organic acid is an organic acid having the formula of $HO_2 CACO_2 H$ in which A is an alkylene group, an arylene group, alkenylene group, or combinations of two or more thereof Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof The presently preferred organic diacid is terephthalic acid because the polyesters produced therefrom have a wide range of industrial applications. Examples of suitable esters include, but are not limited to, dimethyl adipate, dimethyl phthalate, methyl benzoate, dimethyl glutarate, and combinations of two or more thereof.

Any alcohol that can esterify an acid to produce a polyester can be used in the present invention. The presently preferred alcohol is having the formula of $R^3(OH)_n$, an alkylene glycol of the formula $(HO)_nA(OH)_n$, a polyalkylene glycol or alkoxylated alcohol having the formula of $R^3[CH_2CH(R^3)O]_nH$, or combinations of two or more thereof in which each $R^3$ can be the same or different and is a hydrocarbyl radical having 1 to about 10, preferably 1 to about 8, and most preferably 1 to 5 carbon atoms per radical. The presently preferred $R^3$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable solvents include, but are not limited to, ethanol, propanol, isopropanol, butanol, ethylene glycol, propylene glycol, isopropylene glycol, butylene glycol, 1-methyl 1,2-propylene glycol, 1,3-propylene glycol, pentylene glycol, diethylene glycol triethylene glycol, 2-ethyl hexanol, and combinations of two or more thereof The presently preferred solvent is ethylene glycol for the polyester produced therefrom has a wide range of industrial applications.

The catalyst suitable for the present invention comprises, consists essentially of, or consists of a titanium oxide having the formula of $M_xTi^{(III)}Ti^{(IV)}_yO_{(x+3+4y)/2}$ wherein M is an alkali metal, $Ti^{(III)}$ is titanium in the +3 oxidation state, $Ti^{(IV)}$ is titanium in the +4 oxidation state, x and y are numbers greater than or equal to zero wherein if x equals zero then y is a number less than ½. It is most preferred x=0 and y=0. The presently preferred titanium-containing catalyst is $Ti_2O_3$ or $TiO_{1.5}$.

Titanium oxide $M_xTi^{(III)}Ti^{(IV)}_yO_{(x+3+4y)/2}$ can be produced by any suitable methods known to one skilled in the art. It can also be produced by heating $TiO_2$ in a reducing atmosphere, or $Ti_2O_3$ in a slightly oxidizing atmosphere, or by combining three or four valent titanium coordination compounds such as, for example, a titanium alkoxide. It is presently preferred to produce $M_xTi^{(III)Ti(IV)}_yO_{(x+3+4y)/2}$ by heating $TiO_2$ in a reducing atmosphere such as, for example, in the presence of hydrogen or other reducing agents such as sodium borohydride, potassium borohydride, carbon monoxide, an alkylboron compound, or combinations of two or more thereof The $M_xTi^{(III)Ti(IV)}_yO_{(x+3+4y)/2}$ -containing catalyst can also be a combination of individual species whose overall composition is given by the formula $M_xTi^{(III)}Ti^{(IV)}_yO_{(x+3+4y)/2}$.

$M_xTi^{(III)}Ti^{(IV)}_yO_{(x+3+4y)/2}$ wherein M is an alkali metal can be produced by any suitable methods known tone skilled in the art. It can also be produced by reacting $TiO_2$ in the rutile crystalline state with an excess of n-butyl lithium in hexane at room temperature for twelve hours. This material can be subsequently heated to 500° C. in nitrogen.

Suitable catalyst can further comprise a transition metal hydrocarboxide or an exchange compound derivable from a transition metal hydrocarboxide. A titanium tetrahydrocarboxide is the presently preferred transition metal compound because they are readily available and effective. Suitable titanium tetrahydrocarboxide compounds include those expressed by the general formula $Ti(OR^4)_z$ wherein z is a number between 0 and 4 while each $R^4$ is individually selected from an alkyl, cyloalkyl, aryl, alkaryl, and aralkyl hydrocarbon radical containing from 1 to about 30, preferably 1 to about 20 carbon atoms per radical and each $R^4$ can be the same or different. Titanium tetrahydrocarbyloxides in which the hydrocarboxyl group contains from 1 to about 10 carbon atoms per radical which is a linear alkyl radical are most preferred because they are more readily available and are effective in forming the solution. Suitable titanium tetrahydrocarboxides include, but are not limited to, titanium tetramethoxide, titanium dimethoxydiethoxide, titanium tetraethoxide, titanium propoxide, titanium isopropoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetracyclohexyloxide, titanium tetrabenzyloxide, titanium tetratolyloxide, titanium tetraphenoxide, and combinations of any two or more thereof Of the titanium tetrahydrocarboxides, titanium tetraalkoxides are generally preferred and titanium tetrapropoxide is particularly preferred because of its availability and cost.

The catalyst composition can further comprise other compounds which may be added to either enhance the catalyst activity or reaction products. Examples of other compounds include, but not limited to, cobalt/aluminum catalyst, antimony glycoxide, antimony oxide, phosphoric acid, phosphinic acid, esters of phosphoric acid, ethylene glycol silicates, zirconates, titanium dioxide, and combinations of two or more thereof The cobalt/aluminum catalyst comprises a cobalt salt and an aluminum compound in which the mole ratio of aluminum to cobalt is in the range of from 0.25:1 to 16:1. The cobalt/aluminum catalyst is disclosed in the U.S. Pat. No. 5,674,801, disclosure of which is incorporated herein by reference.

The catalyst can be in any physical shape such as solid powder, gel colloidal suspension or solution. It is presently preferred that the particle size of the catalyst is in the range of from about 0.001 to about 250, preferably about 0.001 to about 100, and most preferably 0.001 to I microns. $M_xTi^{(III)}Ti^{(IV)}_y-O_{(x+3+4y)/2}$ can be determined by X-ray scattering, by photoelectron spectroscopy, by elemental analysis, or by weight loss method.

The contacting of polymerization component with the catalyst can be carried out by any suitable means. For example, the individual compositions of the polymerization component can be combined before being contacted with the catalyst. However, it is presently preferred that the catalyst be first dispersed in an alkylene glycol by any suitable means such as mechanical mixing or stirring to produce a dispersion followed by combining the dispersion with an organic diacid, an oligomer of an organic diacid and an alkylene glycol or both under a condition sufficient to effect the production of a polyester.

The oligomer of the diacid and alkylene glycol generally has a total of about 1 to about 100, preferably from about 2 to about 10 repeat units derived from the diacid and alkylene oxide.

A suitable condition to effect the production of a polyester can include a temperature in the range of from about 150° C. to about 500° C., preferably about 200° C. to about 400° C., and most preferably 250° C. to 300° C. under a pressure in the range of from about 0.001 to about 10 atmospheres for a time period of from about 1 to about 20, preferably about 1 to about 15, and most preferably 1 to 10 hours. Such condition can also be used is solid state polymerization.

The molar ratio of the alcohol (or alkylene glycol) to carbonyl compound (or organic acid or ester) can be any ratio so long as the ratio can effect the production of an ester or polyester. Generally the ratio can be in the range of from about 0.1:1 to about 10:1, preferably about 0.5:1 to about 5:1, and most preferably about 1:1 to about 3:1. The molar ratio of the alcohol (or alkylene glycol) to carbonyl compound (or organic acid or ester) for the oligomer having repeat units derived from the carbonyl compound (or organic acid or ester) to alcohol (or alkylene glycol) can have the same ratio of q:(q−1) in which q can be in the range of from about 2 to about 20, preferably about 2 to 10, and most preferably 2 to 5.

The catalyst can be present in the range of about 0.0001 to about 30,000 parts per million by weight (ppmw) of the polymerization medium, preferably about 0.001 to about 1,000 ppmw, and most preferably 0.001 to 100 ppmw.

The present invention is further illustrated by the following examples which are not to be construed as to unduly limit the scope of the invention.

EXAMPLES

In the examples, polyethylene terephthalate was made under the conditions specified. The $TiO_{1.5}$ catalyst used in Examples 1–13 was obtained as $Ti_2O_3$ from the Alfa Aesar division of Johnson Matthey, Inc., Wood Hill, Mass.

Example 1

A 1-liter resin kettle was provided with a Jiffy Mixer stirring agitator with an Electro-Craft Motomatic constant speed controller, a heater, a thermocouple, condenser and nitrogen sweep. To this kettle was added 0.2 g of the $TiO_{1.5}$ catalyst, 115 ml of ethylene glycol, 6.23 μl of concentrated $H_3PO_4$, 0.3 wt % passivated $TiO_2$ delusterant and 400 g of a low molecular weight ethylene terephthalate oligomer formed from ethylene glycol and terephthalic acid. The mixture was stirred at 280° C. at 60 rpm and vacuum of less than 1 torr (133 Pa) for 120 minutes at which time the supply voltage to the vessel's agitator control, an indication of the torque applied to the agitator and therefore of the viscosity of the reactants, reached a limiting value of 150 mv, upon which the polymer was poured into cold water to quench the polymerization. The polymer solid was annealed for crystallization at 150° C. for 12 hours and ground to pass through a 2 mm filter screen for color measurement using a Hunter calorimeter. The polymer color numbers were 69.48 L, −0.91a, 3.08b. The polymer inherent viscosity is 0.58 dL/g, the weight average molecular weight is 27,100 and the Z-average molecular weight is 41,500.

Example 2

$Ti_2O_3$ (1.25 g) was mixed with 228 ml of ethylene glycol and 400 g of a low molecular weight ethylene terephthalate oligomer formed from ethylene glycol and terephthalic acid. The mixture was stirred in a resin kettle as described in Example 1 at 280° C. at 60 rpm and vacuum of less than 1 torr and the limiting voltage on the agitator motor was achieved after 100 minutes of stirring. The polymer was quenched, annealed, ground and analyzed as described in Example 1. The polymer color numbers were 58.34L, −0.80a, 0.28b. The polymer inherent viscosity is 0.58 dL/g, the weight average molecular weight is 26,000 and the Z-average molecular weight is 40,100.

Example 3

The $Ti_2O_3$ titania catalyst was used with 150 g of the ethylene terephthalate oligomer described in Example 1, 10 g ethylene glycol with 76 ppm by weight titania catalyst. The mixture was stirred in a resin kettle as described in Example 1 at 50 rpm and vacuum of less than 1 torr for 60 minutes as the supply voltage to the vessel's agitator control reached a value of 120 mv. The polymer was quenched, annealed, ground and analyzed as described in Example 1. The polymer color numbers were 72.9L, −0.76a, 4.25b. The polymer weight average molecular weight is 48,200 and the Z-average molecular weight is 73,900.

Example 4

$Ti_2O_3$ of previous examples hereinabove disclosed was ground to a finer particle size distribution such that 90% of the particles were less than 10 microns. Poly(ethylene terephthalate) was prepared using 0.8 g of the ground $Ti_2O_3$ catalyst, 115 ml ethylene glycol and 400 g of a low molecular weight oligomer from Example 1 of ethylene glycol and terephthalic acid. The mixture was stirred in a resin kettle as described in Example 1 at 60 rpm and vacuum of less than 1 torr for 45 minutes at which time the supply voltage to the vessel's agitator motor reached a limiting value of 150 mv. The polymer was quenched, annealed, ground and analyzed as described in Example 1. The polymer color numbers were 42.13L, −0.95a, −1.89b. The polymer inherent viscosity is 0.73 dL/g, the weight average molecular weight was 28,100 and the Z-average molecular weight was 43,300.

Example 5

The polymer of this example was prepared by mixing 0.16 g of the $Ti_2O_3$ of Example 4 with 0.3 wt % passivated $TiO_2$ delusterant, 115 ml ethylene glycol and 400 g of the low molecular weight oligomer of ethylene glycol and terephthalic acid described in Example 1. The mixture was stirred in a resin kettle as described in Example 1 at 60 rpm and vacuum of less than 1 torr for 55 minutes at which time the supply voltage to the vessel's agitator motor reached a limiting value of 150 mv. The polymer was quenched, annealed, ground and analyzed as described in Example 1. The polymer color numbers were 54.85L, −1.25a, −1.21b. The polymer inherent viscosity was 0.56 dL/g, the weight average molecular weight was 25,000 and the Z-average molecular weight was 37,900.

Example 6

The polymer of this example was prepared by mixing 0.08 g of the $Ti_2O_3$ of Example 4 with 0.3 wt % passivated $TiO_2$ delusterant, 115 ml ethylene glycol and 400 g of the low molecular weight oligomer of ethylene glycol and terephthalic acid as described in Example 1. The mixture was stirred in a resin kettle as described in Example 1 at 60 rpm and vacuum of less than 1 torr for 115 minutes at which time the supply voltage to the vessel's agitator motor reached a limiting value of 150 mv. The polymer was quenched, annealed, ground and analyzed as described in Example 1. The polymer color numbers were 59.84L, −1.34a, 0.60b. The polymer inherent viscosity is 0.57 dL/g, the weight average molecular weight is 22,800 and the Z-average molecular weight is 35,500.

Example 7

The $Ti_2O_3$ ground as in Example 4 was further ground so that 90% of the particles were smaller than 1 μm. Poly (ethylene terephthalate) was prepared by mixing 0.08 g of the so-ground $Ti_2O_3$ with 0.3 wt % passivated $TiO_2$ delusterant, 115 ml ethylene glycol and 400 g of the low molecular weight oligomer of ethylene glycol and terephthalic acid as described in Example 1. The mixture was stirred in a resin kettle as described in Example 1 at 60rpm and vacuum of less than I torr for 75 minutes at which time the supply voltage to the vessel's agitator motor reached a Limiting value of 150 mv. The polymer was quenched, annealed, ground and analyzed as described in Example 1.

The polymer color numbers were 60.42L, −1.99a, 0.58b. The polymer inherent viscosity was 0.69 dL/g, the weight average molecular weight was 28,800 and the Z-average molecular weight was 43,700.

Example 8

Approximately 2 grams of a lithium-reduced titania catalyst were prepared by reacting white Degussa P25 $TiO_2$ with an excess of n-butyl lithium in hexane at room temperature for 12 hours to form blue/black, anatase-related $Li_xTiO_2$ (x=ca. 0.5). This material was subsequently heated to 500° C. in nitrogen to convert it to the deep blue spinel-related $LiTi_2O_4$. Formation of the spinel was confirmed by X-ray diffraction. Poly(ethylene terephthalate) was prepared using 0.1 g of the lithium titania catalyst, 228 ml ethylene glycol and 400 g of the low molecular weight oligomer of ethylene glycol and terephthalic acid as described in Example 1. The mixture was stirred at 60 rpm and vacuum of less than 1 torr for 100 minutes as the supply voltage to the vessel's agitator control reached a value of 150 mv. The polymer was quenched, annealed, ground and analyzed as described in Example 1. The polymer color numbers were 71.85L, −1.17a, 6.71b. The polymer inherent viscosity is 0.58 dL/g, the weight average molecular weight is 26,800 and the Z-average molecular weight is 41,500.

Example 9

The lithium titania catalyst was prepared as described in Example 8. Poly(ethylene terephthalate) was prepared using 150 g of oligomer described in Example 1, 10 g ethylene glycol and 76 ppm lithium titania catalyst. The mixture was stirred in a resin kettle as described in Example 1 at 50 rpm and vacuum of less than 1 torr for 75 minutes as the supply voltage to the vessel's agitator control reached a value of 120 mv. The polymer was quenched, annealed, ground and analyzed as described in Example 1. The polymer color numbers were 75.17L, −0.88a, 6.9b. The polymer inherent viscosity is 1.02 dL/g, the weight average molecular weight is 53,100 and the Z-average molecular weight is 82,000.

Example 10

Approximately 2 grams of a lithium-reduced titania catalyst were prepared by reacting white Degussa P25 $TiO_2$ (pre-heated to 900° C. to convert it fully to rutile) with an excess of n-butyl lithium in hexane at room temperature for 12 hours. The resultant $Li_xTiO_2$ was light blue in color. X-ray diffraction confirmed that the major phase was rutile-related $Li_xTiO_2$, x=about 0.025. Poly(ethylene terephthalate) was prepared using 150 g of prepolymer described in Example 1, 10 g ethylene glycol and 76 ppm titania catalyst. The mixture was stirred in a resin kettle as described in Example 1 at 50 rpm and vacuum of less than 1 torr for 60 minutes as the supply voltage to the vessel's agitator control reached a value of 120 mv. The polymer was quenched, annealed, ground and analyzed as described in Example 1. The polymer color numbers were 78.73L, −0.67a, 8.12b. The polymer inherent viscosity is 0.84 dL/g, the weight average molecular weight is 52,900 and the Z-average molecular weight is 81,500.

Example 11

The lithium titania catalyst was prepared as described in Example 10. Poly(ethylene terephthalate) was prepared using 150 g of prepolymer described in Example 1, 10 g ethylene glycol, 60 ppm $H_3PO_4$, and 76 ppm titania catalyst. The mixture was stirred in a resin kettle as described in Example 1 at 50 rpm and vacuum of less than 1 torr for 300 minutes as the supply voltage to the vessel's agitator control reached a value of 120 mv. The polymer was quenched, annealed, ground and analyzed as described in Example 1. The polymer color numbers were 78L, 0.12a, 7.36b. The polymer inherent viscosity is 0.85 dL/g, the weight average molecular weight is 27,200 and the Z-average molecular weight is 44,000.

Example 12

Approximately 2 grams of a lithium-reduced titania catalyst were prepared by reacting white Degussa P25 $TiO_2$ with an excess of n-butyl lithium in hexane at room temperature for 12 hours. The resultant $Li_xTiO_2$ was blue/black in color. X-ray diffraction confirmed that the major phase was anatase-related $Li_xTiO_2$, x=about 0.5. Poly(ethylene terephthalate) was prepared using 150 g of prepolymer described in Example 1, 10 g ethylene glycol, 60 ppm $H_3PO_4$, and 76 ppm lithium titania catalyst. The mixture was stirred in a resin kettle as described in Example 1 at 50 rpm and vacuum of less than 1 torr for 180 minutes as the supply voltage to the vessel's agitator control reached a value of 120 mv. The polymer was quenched, annealed, ground and analyzed as described in Example 1. The polymer color numbers were 80.4L, −0.13a, 6.08b. The polymer inherent viscosity is 0.85dL/g, the weight average molecular weight is 40,900 and the Z-average molecular weight is 63,000.

Example 13

Prepolymer was prepared in a 600 liter reactor by combining 34.1 kg dimethyl terephthalate, 23.0 kg ethylene glycol, and 4.80 g zinc acetate dihydrate, heating to 200° C. with agitation while methanol was distilled from the reaction mixture. After the methanol distillation was completed, the prepolymer was removed and used as a master batch for subsequent polymerizations. Its color numbers are 85.6L, −0.45a, +5.07b.

Polyethylene terephthalate was prepared using 150 g of the prepolymer so made, 10 g ethylene glycol and 76ppm by weight of the same $Ti_2O_3$ used in Example 1. The mixture was stirred in a resin kettle as described in Example 1 at 50 rpm and vacuum of less than 1 torr for 60 minutes at which time the supply voltage to the vessel's agitator motor reached a limiting value of 120 mv. The polymer was quenched, annealed, ground and analyzed as described in Example 1. The polymer color numbers were 72.9L, −0.76a, 4.25b. The polymer weight average molecular weight was 48,200 and the Z-average molecular weight was 73,900.

Examples 14–30

Trimethylene Terephthalate Oligomer

A master batch of oligo(trimethylene terephthalate) was prepared in a 600 liter reactor by combining 34.1 kg dimethyl terephthalate, 23.0 kg ethylene glycol, and 4.80 g zinc acetate dihydrate, heating to 200° C. with agitation while methanol was distilled from the reaction mixture. After the methanol distillation was completed, the prepolymer was quenched in cold water, removed and dried. Each of the following polycondensations runs were carried out starting from the same, master batch of oligo(trimethylene terephthalate). All polycondensations were done with the same batch of trimethylene glycol at the same glycol to oligomer molar ratio of 2; and in stir-agitated 3-neck flasks fitted with nitrogen purge, sealed stir-shafts, stir motor controller with torque sensor and condensers. Each flask was used for only one polymerization before it is discarded. Specifically, 70 g of oligomer were combined with additional 48.8 ml of glycol with equipment which provided reduced gas headspace to prevent glycol refluxing; pure nitrogen blanketing to reduce oxygen contamination; constant speed agitation for consistent melt surface renewal rates; vacuum level staging to 2 torr and insulation to reduce oligomer sublimation; and fast end-of-the-run melt quenching. All products were analyzed for conversion in terms of weight average molecular weight via size exclusion chromatography and color after complete crystallization and grinding to uniform powder. All polycondensations were done at 250° C. for only 150 minutes with identical heating times and evacuation times.

Ultraviolet Synthesis of Ti(III) from Titanium Triethanolaminato Ispropoxide (TiTe-III)

Tyzor TE® comprising titanium triethanolaminato ispropoxide was obtained from DuPont. About 20 ml of this product was sealed in glass tube and placed underneath a broad-band ultraviolet lamp for about one week until the solution color became a steady, dark bluish-purple which indicates the presence of titanium in the oxidation state Ti(III).

Ultraviolet Synthesis of Ti(III) from Titanium Lactate (TiLa-III)

Tyzor LA® comprising titanium lactate in water was obtained from DuPont (Wilmington, Del.). About 20 ml of this product was sealed in glass tube and placed underneath a broad-band ultraviolet lamp for about one week until the solution color became a steady, dark bluish-purple which indicated the presence of titanium in the oxidation state Ti(III).

Ultraviolet Synthesis of Ti(M) from Titanium Propoxide (TiPr-III)

Titanium(IV) proxide in propanol was obtained from Aldrich Chemicals (Milwaukee, Wis.). About 20 ml of an equichoric mixture of titanium proxide and ethylene glycol was sealed in glass tube and placed underneath a broad-band ultraviolet lamp for about one week until the solution color became a steady, dark violet which indicates the presence of titanium in the oxidation state Ti(III).

Microscopic (sub-micro) $Ti_2O_3$ ($\mu Ti_2O_3$)

Titanium(III) trioxide (titanium (III) sesquioxide)was purchased from Aldrich Chemicals, suspended in ethylene glycol and ground in a ball mill so that 90% of the particles were smaller than 1 micron in diameter. The suspension was dried by evaporating the glycol in a vacuum oven at 250° C.

The Example number, the catalyst systems used to polymerize the oligo(trimethylene terephthalate) master batch, and the polymer products' Hunter L,a,b color numbers and weight-average molecular weight are described in the following Table 1.

TABLE 1

| Example | Catalyst-PPM | L | a | b | Mw |
|---|---|---|---|---|---|
| 14 | $\mu Ti_2O_3$ 116 ppm Ti(III) | 53.76 | −0.87 | −0.22 | 16,277 |
| 15 | $\mu Ti_2O_3$ 1163 ppm Ti(III) | 41.77 | −0.52 | −0.69 | 13,624 |
| 16 | $\mu Ti_2O_3$ 11.6 ppm Ti(III) | 68.10 | −0.32 | 4.73 | 13,238 |
| 17 | $\mu Ti_2O_3$ 1.16 ppm Ti(III) | 76.40 | 0.52 | 7.31 | 9,029 |
| 18 | $\mu Ti_2O_3$ 11.6 ppm Ti(III) Ti(OPr)$_4$ 58.1 ppm Ti(IV) | 66.97 | −0.45 | 4.48 | 18,978 |
| 19 | $\mu Ti_2O_3$ 11.6 ppm Ti(III) Ti(OPr)$_4$ 58.1 ppm Ti(IV) Si(OEt)$_4$ 34.1 ppm Si | 69.08 | −0.19 | 4.39 | 14,013 |
| 20 | $\mu Ti_2O_3$ 11.6 ppm Ti(III) Ti(OPr)$_4$ 11.6 ppm Ti(IV) | 67.16 | −0.66 | 4.37 | 18,887 |

TABLE 1-continued

| Example | Catalyst-PPM | L | a | b | Mw |
|---|---|---|---|---|---|
| 21 | $\mu Ti_2O_3$ 11.6 ppm Ti(III) Ti(OPr)$_4$ 116.3 ppm Ti(IV) Si(OEt)$_4$ 68.2 ppm Si | 67.80 | −0.64 | 3.90 | 16,781 |
| 22 | $\mu Ti_2O_3$ 5.8 ppm Ti(III) Ti(OPr)$_4$ 58.1 ppm Ti(IV) | 70.21 | −0.45 | 5.47 | 26,073 |
| 23 | $\mu Ti_2O_3$ 5.8 ppm Ti(III) Ti(OPr)$_4$ 58.1 ppm Ti(IV) Oxalic Acid 109 ppm COOH | 69.10 | −0.03 | 5.06 | 16,189 |
| 24 | TiLa-III 58.1 ppm Ti(III) | 66.87 | 1.44 | 7.31 | 14,600 |
| 25 | TiLa-III 116.3 ppm Ti(III) | 67.97 | 1.47 | 8.17 | 9,500 |
| 26 | TiPr-III 58.1 ppm Ti(III) | 73.15 | 0.66 | 6.40 | 12,529 |
| 27 | TiTe-III 58.1 ppm Ti(III) | 69.79 | 1.17 | 7.64 | 13,593 |
| 28 | TiTe-III 116.3 ppm Ti(III) | 71.80 | 0.75 | 7.79 | 13,921 |
| 29 | TiTe-III 232.5 ppm Ti(III) | 71.4 | 1.40 | 8.90 | 9,650 |
| 30 | TiTe-Ill 465.1 ppm Ti(III) | 67.72 | 1.23 | 8.79 | 22,568 |

The Examples disclosed herein show that these highly-reduced titania oxide catalyst systems can produce polyesters of high molecular weight and low yellow color. Furthermore, these catalyst systems can be used in conjunction with other catalysts and additives.

That which is claimed is:

1. A process comprising contacting, in the presence of a catalyst, a carbonyl compound and an alcohol wherein said catalyst comprises a titanium-containing compound having the formula of $M_x Ti^{(III)}_y Ti^{(IV)}_y O_{(x+3+4y)/2}$ wherein M is an alkali metal, $Ti^{(III)}$ is titanium in the +3 oxidation state, $Ti^{(IV)}$ is titanium in the +4 oxidation state, x and y are each a number greater than or equal to zero, and if x equals to zero, y is a number less than ½.

2. A process according to claim 1 wherein said carbonyl compound has the formula of RCOOR and said alcohol has the formula of HOAOH wherein each R is independently selected from the group consisting of hydrogen, a hydrocarboxyl radial, a hydrocarbyl radical, and combinations of two or more thereof, each radial has 1 to about 30 carbon atoms and is selected from the group consisting of alkyl radical, aryl radical, alkaryl radical, aralkyl radical, alkenyl radical, and combination of two or more thereof; and A is selected from the group consisting of alkylene goup, arylene group, alkenylene group, and combinations of two or more thereof.

3. A process according to claim 1 wherein said alcohol is selected from the group consisting of ethylene glycol, propylene glycol, isopropylene glycol butylene glycol, 1-methyl propylene glycol, pentylene glycol, and combinations of two or more thereof.

4. A process according to claim 2 wherein said alcohol is ethylene glycol.

5. A process according to claim 1 wherein said carbonyl compound is selected from the group consisting of terephthalic acid, dimethyl terephthalate, isophthalic acid, napthalic acid, succinic acid, adipic acid, phthalic acid, glutaric acid, acrylic acid, oxalic acid, benzoic acid, maleic acid, propenoic acid, and combination of two or more thereof.

6. A process according to claim 1 wherein said carbonyl compound is terephthalic acid.

7. A process according to claim 6 wherein said alcohol is ethylene glycol.

8. A process according to claim 1 wherein M is lithium.

9. A process according to claim 1 wherein x is 0.

10. A process according to claim 1 wherein y is 0.

11. A process according to claim 9 wherein y is 0.

12. A process according to claim 7 wherein x is 0, y is 0, and said catalyst is $Ti_2O_3$ or $TiO_{1.5}$.

13. A process according to claim 1 wherein said alcohol is selected from the group consisting of ethylene glycol, propylene glycol, isopropylene glycol, butylene glycol, 1-methyl propylene glycol, pentylene glycol, and combinations of two or more thereof; said carbonyl compound is a terephthalic acid or derivative of terephthalic acid; and said catalyst is $TiO_{1.5}$.

14. A process according to claim 13 wherein said alcohol is ethylene glycol; and said carbonyl compound is selected from the group consisting of terephthalic acid, dimethyl terephthalate, and combinations thereof.

15. A process according to claim 13 wherein said carbonyl compound is terephthalic acid and said alcohol is ethylene glycol.

16. A process comprising contacting, in the presence of a catalyst, an alcohol with a carbonyl compound under a condition sufficient to produce a polymer comprising repeat units derived from said alcohol and said carbonyl compound wherein said catalyst comprises a titanium-containing compound having the formula of $M_x Ti^{(III)}_{} Ti^{(IV)}_y O_{(x+3+4y)/2}$ wherein M is an alkali metal, $Ti^{(III)}$ is titanium in the +3 oxidation state, $Ti^{(IV)}$ is titanium in the +4 oxidation state, x and y are numbers greater than or equal to zero, and if x equals to zero, y is a number less than ½;

said alcohol is selected from the group consisting of ethylene glycol, propylene glycol, isopropylene glycol, butylene glycol, 1-methyl propylene glycol, pentylene glycol, and combinations of two or more thereof; and said carbonyl compound is selected from the group consisting of terephthalic acid, dimethyl terephthalate, isophthalic acid, napthalic acid, succinic acid, adipic acid, phthalic acid, glutaric acid, acrylic acid, oxalic acid, benzoic acid, maleic acid, propenoic acid, and combination of two or more thereof.

17. A process according to claim 16 wherein said catalyst is $Ti_2O_3$ or $TiO_{1.5}$, said alcohol is ethylene glycol, and said carbonyl compound is selected from the group consisting of terephthalic acid, dimethyl terephthalate, and combinations thereof.

18. A process according to claim 17 wherein said carbonyl compound is terephthalic acid.

19. A process comprising contacting, in the presence of a catalyst which comprises $Ti_2O_3$ or $TiO_{1.5}$, terephthalic acid with ethylene glycol.

* * * * *